April 25, 1950     M. L. DEVOL     2,505,103
METHOD OF MAKING PLATE GLASS

Filed Feb. 26, 1943     3 Sheets-Sheet 1

Inventor
MANSON L. DEVOL

By Olen E. Bee
Attorney

April 25, 1950  M. L. DEVOL  2,505,103
METHOD OF MAKING PLATE GLASS

Filed Feb. 26, 1943  3 Sheets-Sheet 3

Inventor
MANSON L. DEVOL

By Olen E. Bee
Attorney

Patented Apr. 25, 1950

2,505,103

UNITED STATES PATENT OFFICE 2,505,103

METHOD OF MAKING PLATE GLASS

Manson L. Devol, Wilkinsburg, Pa., assignor to Pittsburgh Plate Glass Company, Allegheny County, Pa., a corporation of Pennsylvania Application February 26, 1943, Serial No. 477,232

2 Claims. (Cl. 49—83.1)

The present invention relates to the formation of glass sheets and it has particular relation to the formation of such sheets by a drawing operation.

One object of the invention is to provide a process of forming glass sheets of high uniformity of thickness.

A second object is to provide glass sheets of uniform thickness and highly polished surface by a drawing operation.

A third object is to simplify cooling and to prevent wear and erosion of the forming rollers employed in sizing the glass sheets.

These and other objects of the invention will be apparent from consideration of the following specification and the appended claims.

It is well recognized that molten glass constitutes a relatively viscous substance having a high degree of cohesion and ductility, so that it can be drawn out into very thin sheets and filaments without rupture. These harden into permanent form upon cooling. These properties are commonly taken advantage of in the manufacture of sheet glass by a drawing operation. The sheet is formed by pulling out a broad ribbon of molten glass from a pool. The glass in this ribbon is subjected to relatively prompt cooling in order to solidify it in sheet form fairly quickly after it is drawn from the pool. The thickness of the sheet is controlled by control of the fluidity of the glass in the pool and immediately after it is drawn out into sheet form and also by control of the rate of drawal. The process as conventionally practiced is highly sensitive and is based upon exact control of all operating conditions. Even relatively slight changes in such factors as the temperature of the bath and the temperature of the atmosphere about the bath or the sheet itself produce substantial effects upon the sheet which is being drawn. For example, if the atmosphere becomes chilled through the introduction of an unusual amount of cold air into the zone of drawing the sheet may become warped or wavy and there will be changes in the thickness thereof, due to inequality in the cooling of the molten glass in the sheet.

The use of sizing rollers, e. g., rollers driven at the speed of the glass and in contact with the latter, in order to obtain in a positive manner uniformity of thickness and freedom from waviness while the sheet is still relatively soft and plastic, might naturally suggest itself. However, in actual practice such rollers have been found to be objectionable, because they tend to scratch and mar the sheet. Furthermore, they usually become relatively highly heated during the drawing operations and often one portion is more highly heated than others. This results in certain degree of warpage which is translated into variations in the caliper of the glass sheets. Moreover, the hot glass tends to wear and erode the rollers in an objectionable way so that the surface finish of the latter is soon destroyed.

In accordance with the provisions of the present invention the foregoing difficulties are obviated or substantially reduced by the provision of sizing rollers adapted to press the glass sheet or ribbon out to uniform thickness as it is formed, but having relatively thin films of air or other gas clinging to the surfaces thereof in such manner as to prevent actual contact of the solid surfaces of the rollers with the soft and ductile glass.

For a better understanding of the invention reference may now be had to the accompanying drawings, in which like numerals refer to like parts throughout.

In the drawings, Figs. 1, 2 and 3 are respectively fragmentary sectional views illustrating three different applications of the process of the invention;

Figs. 5 and 6 are respectively a side view and a plan view of a form of slip plate that may be employed with the apparatus shown in Figs. 1 and 2;

Fig. 7 is a sectional view of a porous roller which may be employed in the practice of the invention.

Figure 1:
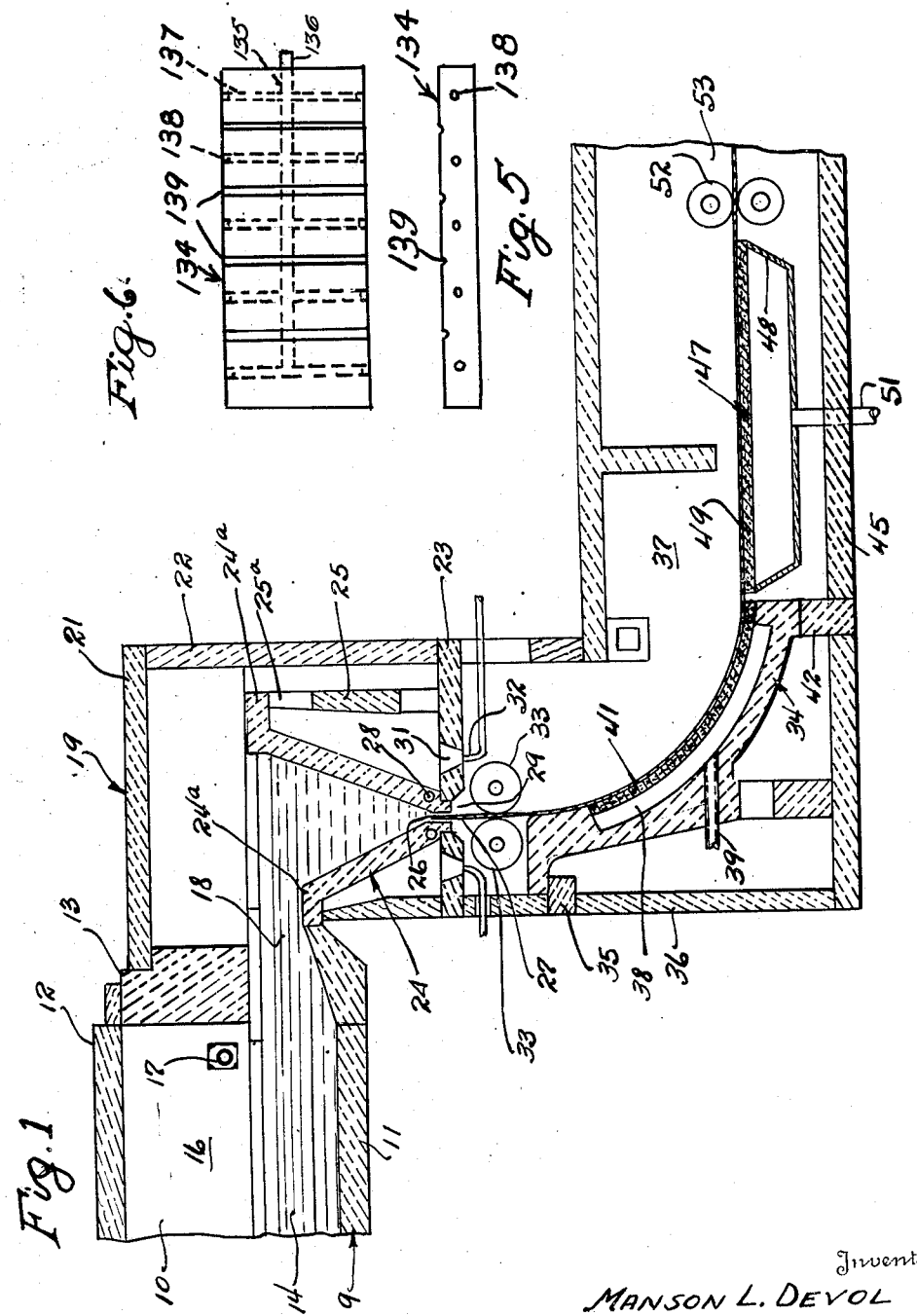

In the form of the invention shown in Fig. 1 a tank 9 for molten glass is formed in conventional manner of refractory material and includes sides 10, a bottom 11, a top 12 and an end block or wall 13. The tank is divided into a lower portion 14, in which is a pool of molten glass and an upper chamber 16 into which combustion gases and air may be introduced through ports 17.

A throat 18 conducts molten glass from the pool in the bottom of the tank to a drawing chamber 19 including a top or arch 21 and end wall 22 and a bottom 23. Of course the forehearth, like the tank, also includes side walls, but these do not appear in the sectional view. The drawing chamber is provided with a hopper 24 for molten glass having a rim 24a resting at its forward edge upon a web 25 having perforations 25a for circulation of gases. The hopper terminates at its lower extremity in a slot 26 designed to initiate the formation of the glass sheet 27. Passages 28 may be provided in the walls of the hopper upon opposite sides of the slot in such manner as to admit of chilling of the glass as it flows through the slot. In this way it is possible slightly to harden the fluid glass in order to retard or promote the flow of glass at will. The lower extremity of the hopper 24 is supported upon the bottom element 23 of the forehearth in such manner that the slot 26 registers with an opening 29. The bottom 23 is also provided with ports 31 into which burners 32 for combustion gases are projected. Flames from these burners play upwardly about the hopper 24 in such manner as to maintain the fluidity of the contents thereof and escape through perforations 25a.

Sizing rollers 33 are disposed immediately below the opening 29 and are spaced properly to size sheet 27 as it emerges from the slot 26 and while it is still relatively soft and plastic. In order to prevent physical contact of the roller surfaces with the soft glass provision is made for the maintenance of a thin adherent film of air to the surface. A convenient method of maintaining such film involves rotating the rollers at a relatively high velocity, e. g., at such rate that the surfaces of the rollers travel at peripheral speeds of approximately 800 to 6000 inches per minute or even above. A speed of 2000 to 4000 inches per minute would be a good average. This mode of operating the sizing rollers is described and claimed specifically in my copending application now issued as of October 30, 1945 as Patent No. 2,387,886. Usually these speeds will be at least three times as great as the speed of the glass ribbon which is traveling between the rollers and it may even be very much greater. It is well recognized that rapidly rotating cylindrical bodies maintain thin films of air upon the surfaces thereof, which will withstand considerable physical pressure without actual dispersion. For example, it is quite possible to rotate shafts in bearings in such manner that the shafts are supported upon the thin films of clinging or adherent air, thus obtaining rotation of the shafts practically without friction or wear, and without the use of lubricants. The same principle is applied in the present case. The films of air probably in most instances are only a few thousandths of an inch in thickness, e. g., 2 to 5 thousandths, and they may be substantially less. But still they prevent any actual physical contact of the rollers with the glass while at the same time sufficient pressure is exerted upon the ribbon to smooth out any inequalities in the surface thereof.

The ribbon or sheet 27 passes through the rollers 33 without marring of its surface and is received upon an apron 34, which is arcuate in longitudinal section and preferably constitutes approximately 90 degrees of a circle. This apron is supported at its rear end by block 35 projecting from wall 36, constituting the rear wall of a tunnel 37. The apron is provided with an air chamber 38 supplied with air under slight pressure through a conduit 39. The face of the apron is formed of porous plate 41, which serves to permit air in the chamber slowly to escape outwardly to provide a clinging film between the sheet 27 and the outer surface of the cover element without entrapping bubbles in the glass. This apron functions to deflect a sheet of glass laterally to a horizontal position approximately without friction and without any contact of a solid surface with the plastic glass. Apron 34 is supported at its lower extremity upon a block 42 in the bottom portion 45 of the tunnel 37.

Contiguous to the lower extremity of the apron is a second apron 47 which preferably is flat or plane in its upper surface and which includes a box-like body 48 constituting an air chamber and a flat porous plate element 49 similar in texture and composition to the element 41. Air under slight pressure is supplied to the chamber by means of a conduit 51, extending through the bottom portion of the element 48. The glass sheet after it passes over the apron 47 is sufficiently hardened that it can withstand contact with solid surfaces without scratching or distortion. Accordingly, it is passed between rollers 52, which are journaled in the side walls 53 of the tunnel. These rollers may be driven by any convenient motive force (not shown) and preferably they are so operated as to place a slight degree of tension upon the sheet. This, however, may not always be required since the loop of glass ribbon between the slot 26 and the apron 40 will be reason of its own weight maintain a certain degree of tension, which may be sufficient to maintain the proper movement of the ribbon. The sheet is carried by the rollers to a lehr (not shown) for annealing.

Figure 2:
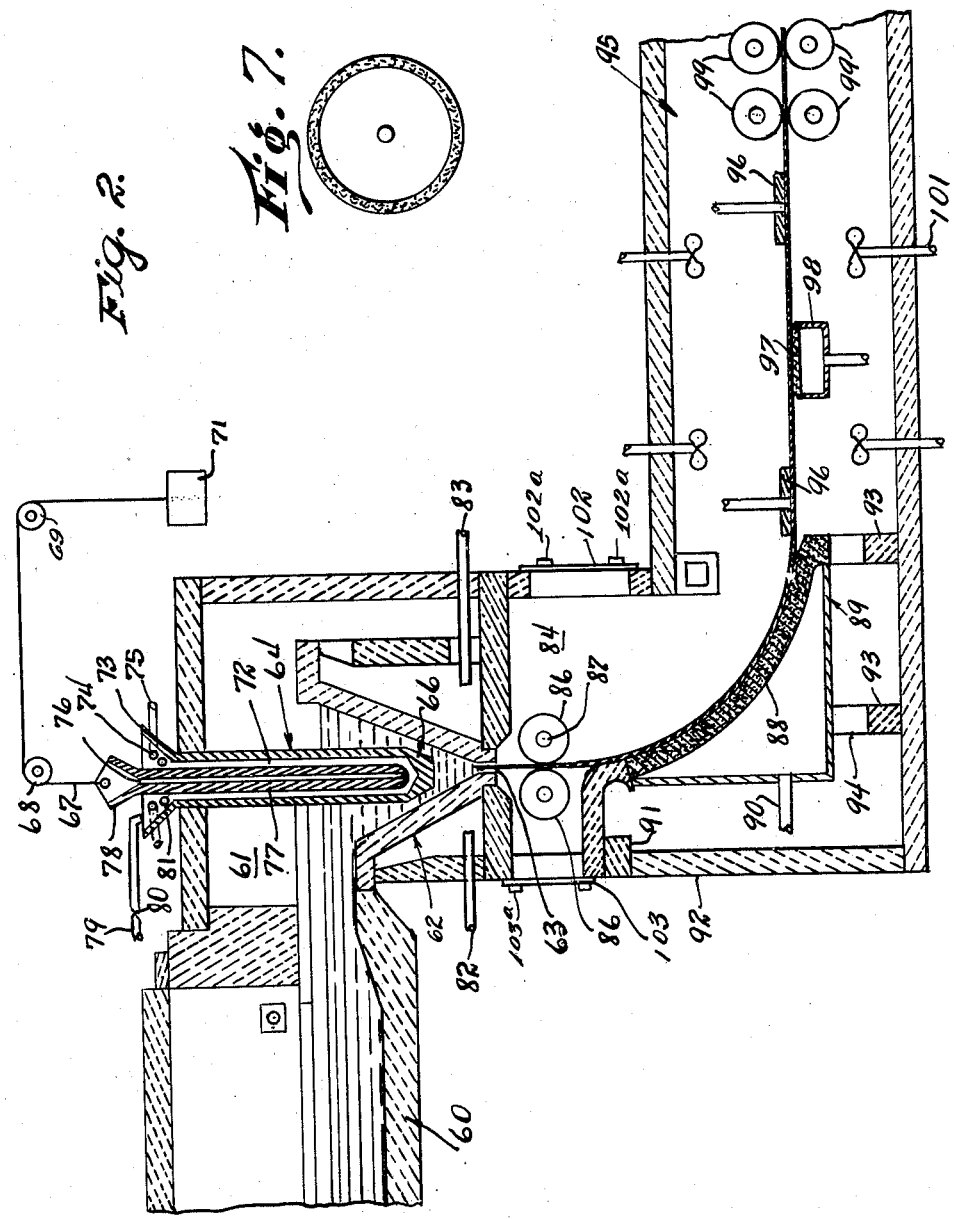

The construction as shown in Figure 2 is basically similar to that shown in Figure 1. It includes a tank 60 corresponding to the tank 9, a drawing chamber 61 corresponding to the chamber 19, and a hopper 62 corresponding to the hopper 24.

However, in order to regulate the flow of glass through the slot 63, in the bottom of the hopper, a plug device 64 is provided. This device is of the same width as the inside of the hopper and at its lower edge is bevelled as indicated at 66 approximately to the same angle or slope as the side walls of the latter. This plug device at its upper edge is attached to a cable or cables 67, trained over pulleys 68 and 69 and is provided at its extremity with a counterweight 71. The plug device is formed with a channel 72 of U-like section extending down one face of the device and up the opposite face. This channel at its ends opens into troughs 73 for the reception of discharged cooling fluid. The trough if desired may include at one end openings 74 through which any excess of cooling medium may be discharged by hose connections 75. Cooling medium is fed into the channel 72 through a single vertically formed port 76 extending downwardly through the web 77 between the branches of the channel in such manner that cooling fluid is discharged equally upon opposite sides of the device 64. At its upper extremity the web is provided with a hopper or trough 78 into which cooling medium can be introduced by means of a conduit 79, provided with a valve 80 for controlling the flow. It is apparent that by raising or lowering the element 64 and also by adjusting the flow of cooling fluid, it is possible to control the flow and viscosity of the glass through the slot 63 with a high degree of accuracy. The distribution of liquid coolant transversely of the chamber may be controlled by balls or slugs 81 dropped into troughs 73 at appropriate points. The fluid will flow around these elements but will be retarded sufficiently to meet local operating conditions. For example, if the glass is too cool at the ends of the slot 63, a few balls can be dropped into the troughs 73 at the proper points to retard cooling in the cool zones. This accuracy may further be promoted by provision of burners 82 and 83 designed to supply combustion gases to maintain flames playing against the sides of the hopper 62. In event that the glass of the hopper is too cool or too hot its temperature may be adjusted by regulating the flame from the burners.

The glass sheet from the slot 63 is discharged downwardly into a chamber 84 in which are disposed sizing rollers 86 so disposed as to receive the glass sheet as it is discharged downwardly. These rollers should be blanketed with a film of air and for this purpose they may be mounted to rotate at such speed as is required to maintain a film. However, they may also be formed of a refractory porous material corresponding to the material in the elements 41 and 47. The rollers in the latter case constitute hollow shells having ports 87 in the ends thereof extending coaxially through the journals of the shaft and constituting means for the introduction of gas under pressure. This gas bleeds out slowly through the pores of the rollers to maintain the requisite clinging films of air, which prevent contact of the roller surfaces with the glass sheet and blasts of air away from the surface of the rollers that might mar the surfaces of the glass are obviated.

A porous arcuate apron 88, corresponding to the apron 41, is also provided below the rollers 86 to receive the freshly formed and sized sheet of glass. This apron is exposed as one face or side of a closed air chamber 89 to which air is supplied under slight compression by means of a conduit 90. The apron is supported at its upper end upon block 91 projecting from wall 92, corresponding to the wall 36, and at its lower end it is supported upon blocks 93, perforated as indicated at 94 for circulation of gases.

The glass sheet from the apron is discharged into a tunnel 95. However, the glass instead of being supported upon a relatively broad apron corresponding to the apron 47 is supported upon opposite faces by means of alternate narrow impermeable plates 96 and narrow porous plates 97 upon air chambers 98. The plates 96 may be of solid metal having smooth surfaces and central openings into which are threaded conduits for the introduction of air under pressure. In this instance the air escapes outwardly about the lower extremity of the conduit and into the space between the sheet of glass and the lower face of the plate. The film between the plate and the glass is very thin so that the air is greatly speeded up in its movement and in speeding up it creates a suction between the plate and the glass in accordance with the well known Bernoulli principle. This suction holds the glass sheet in suspended position, thus permitting cooling gases in the tunnel to contact with and cool the lower face of the glass. The plate 97 operates to support the glass between the plates or disks 96 from below, thus permitting the upper surface of the glass again to be exposed to a cooling atmosphere. Obviously as many impermeable plates 96 and porous plates 97 may be employed as required in carrying the glass sheet for sufficient time to permit it to be cooled to a satisfactory degree upon opposite faces. The hardened sheet while still above annealing temperature is carried away by means of driven rollers 99 and is subsequently conducted through an annealing lehr where its temperature is brought slowly to a point below that of annealing in order to relieve internal stresses in the glass.

The circulation of cooling gases in the tunnel may be promoted by a series of fans 101 driven by means (not shown) in order to assure uniform and adequate circulation of air about both faces of the glass at all time. The circulation of air in the chamber 84 may also be promoted or regulated by means of doors 102 and 103, hinged at 102a and 103a respectively upon opposite sides of the chamber 84 and being adjustable in such manner as to permit the inflow or outflow of air to meet any desired operating conditions.

Figure 3:
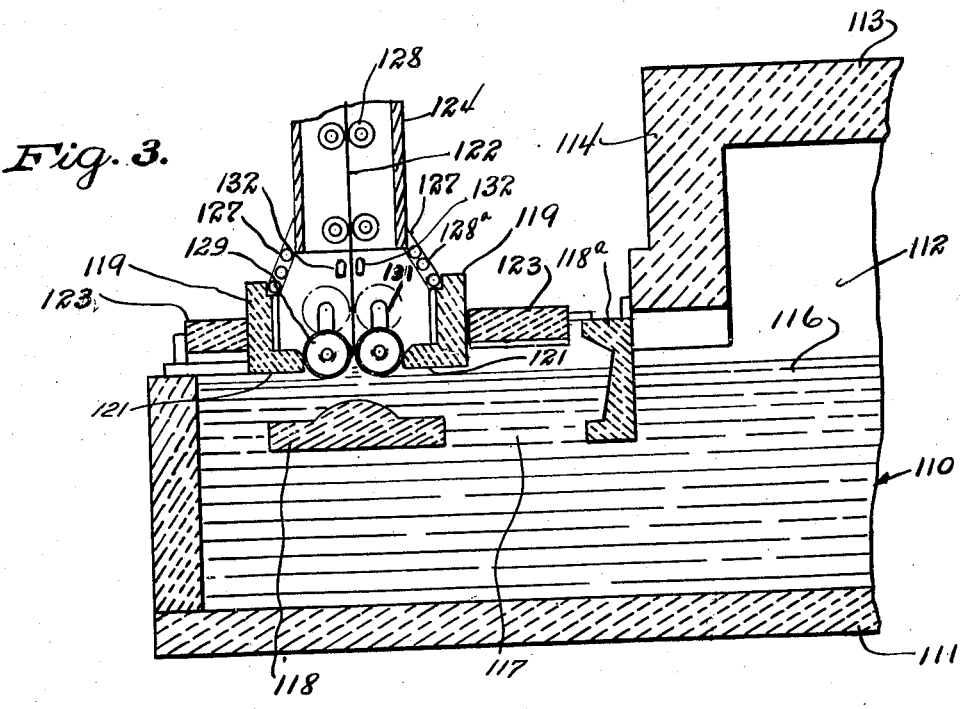
Figure 4:
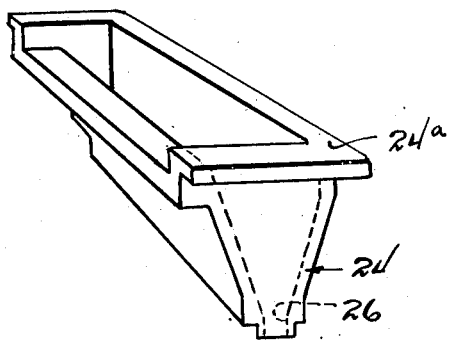
Fig. 4 is a perspective view of a hopper for use in forming the glass sheet in the apparatus shown in Figs. 1 and 2.

In the form of the invention shown in Figure 3 provision is made for vertically drawing a sheet of glass in accordance with more conventional methods. In this construction a tank 110 is provided with a bottom 111, side walls 112, a top or arch 113 and an end wall 114. The tank discharges through a throat 116 to a drawing chamber or forehearth 117. A skim bar 118a is disposed in or contiguous to the throat and projects below the surface of the glass in such manner as to hold back any froth or flowing particles upon the surface of the glass in the tank. In the drawing chamber is disposed a draw-bar 118 and L blocks 119, the latter of which include lower flanges 121 disposed contiguous to the surface of the molten glass and being so spaced with respect to each other as to provide for the upward passage of a sheet 122 of glass while it is being drawn. The L blocks may be supported by a cover or roof structure 123 for the drawing chamber. Above the L blocks is disposed a vertical lehr 124 having pairs of driven rollers 128 for drawing the sheet of glass upwardly as it is formed. The space between the upper ends of the L blocks and the lower ends of the lehr may be closed by means of members 127, having conduits 128a for the circulation of a cooling medium, such as water.

The glass sheet is maintained in position and sized to uniform thickness by means of a set of rollers 129, which are operated with a blanket or film of air upon the surface thereof. These rollers may be spinning rollers, e. g., rollers driven at such speed as inherently to maintain a clinging film of air or as shown in Fig. 7 the rollers may be of porous structure for the reception of gases under pressure, as already described. The rollers are vertically adjustable in guide slots 131 from a position corresponding to the meniscus of the glass as indicated in solid lines to position, as indicated in broken lines well above the meniscus, but in a zone in which the glass is still sufficiently soft and plastic to admit of sizing to uniform thickness.

In a zone above the sizing rollers are disposed a pair of conventional coolers 132, which may be supplied with cooling fluid and are in general of conventional design. After the sheet of glass has passed the coolers, it is sufficiently hard to admit of contact with the rollers 128 without distortion or surface marring. Therefore, it can be passed to the annealing lehr where it is gradually cooled in such manner as to prevent internal stresses in the glass.

In Figs. 5 and 6 is shown a form of porous plate or slip plate that may conveniently be substituted for the porous plates and air chambers shown in Figs. 1 and 2. In the construction, as illustrated in Figs. 5 and 6, a porous plate 134, either flat or curved, is bored longitudinally as indicated at 135 and the bore is connected to a conduit 136, that supplies air under very slight pressure, e. g. ½ to 3 pounds. The plate is also bored transversely to provide lateral branches 137 communicating with bore 135. The bores 137 preferably are plugged at their ends as indicated at 138. In order to assist the escape of air from under the glass sheet, transverse surface channels 139 may be formed between each pair of branches 137.

In accordance with the provisions of the present invention sheet glass is continuously drawn from a pool of molten glass and is accurately sized between spaced rollers disposed in such manner that the sheet is brought to exact caliper. At the same time actual physical contact between the surface of the rollers and glass is prevented by the blanketing films of quiescent gases. These films, as previously stated, are probably of the order of a few thousandths of an inch, e. g., .002 to .010 inch in thickness, but they are still sufficient to prevent actual contact between glass and solid surfaces. Therefore, the natural fire polish of the glass is maintained to a remarkable degree.

Since there is no physical contact between the rollers and the hot fluid glass and since the rollers are driven at comparatively high speed it will be apparent that the surfaces of the rollers are brought to substantially uniform temperature and are so maintained at all times. Heat transfer to the rollers is only by radiation. Therefore, warpage and distortion of rollers is prevented. Of course wear and corrosion are also obviated.

The sheets in most instances are so uniform as to caliper and free from waves and other distortions as to permit their use for most applications for which plate glass is commonly selected without further treatment. However, if higher uniformity is required, they can be ground and polished under revolving disks supplied with slurrys of abrasive in accordance with conventional methods. Since the glass inherently is highly uniform as to surface but little need be removed and they are much easier than conventional sheet glass to bring their final condition under the grinding and polishing disks.

It is to be understood that the forms of the invention herein shown and described are merely exemplary. It will be apparent to those skilled in the art that the numerous modifications may be made therein without departing from the spirit of the invention or the scope of the claims.

What I claim is:
1. A method of forming smooth sheets of glass of uniform thickness which comprises drawing glass vertically as a hot, plastic ribbon from a pool of molten glass and passing the hot, plastic ribbon between a pair of spaced smoothing and sizing rollers, maintaining clinging films of air upon the surfaces of the rollers sufficient to prevent physical contact between the surfaces of the rollers and the glass whereby to smooth and size the glass without physical contact with solid surfaces, then cooling and hardening the ribbon out of contact with solid surfaces.

2. A method of forming smooth sheets of glass of uniform thickness which comprises drawing molten glass as a hot, plastic ribbon upwardly from a pool of glass and passing the ribbon between spaced sizing rollers disposed contiguous to the meniscus of the ribbon and maintaining clinging films of air upon the surfaces of the rollers whereby to smooth and size the ribbon without physical contact between the ribbon and the surface of the rollers, then cooling and hardening the ribbon out of contact with solid surfaces.

MANSON L. DEVOL.

REFERENCES CITED

The following references are of record in the file of this patent:

UNITED STATES PATENTS

| Number | Name | Date |
|---|---|---|
| 1,591,179 | Myers | July 6, 1926 |
| 1,657,214 | Kutchka | Jan. 24, 1928 |
| 1,821,375 | Brancart | Sept. 1, 1931 |
| 1,827,138 | Brancart | Oct. 13, 1931 |
| 1,831,060 | Drake | Nov. 10, 1931 |
| 1,891,373 | Danner | Dec. 20, 1932 |
| 2,094,403 | Hohmann | Sept. 28, 1937 |
| 2,243,194 | Cook | May 27, 1941 |
| 2,336,510 | Spinasse | Dec. 14, 1943 |
| 2,387,886 | Devol | Oct. 30, 1945 |

FOREIGN PATENTS

| Number | Country | Date |
|---|---|---|
| 9,033 | Great Britain | 1904 |